UNITED STATES PATENT OFFICE.

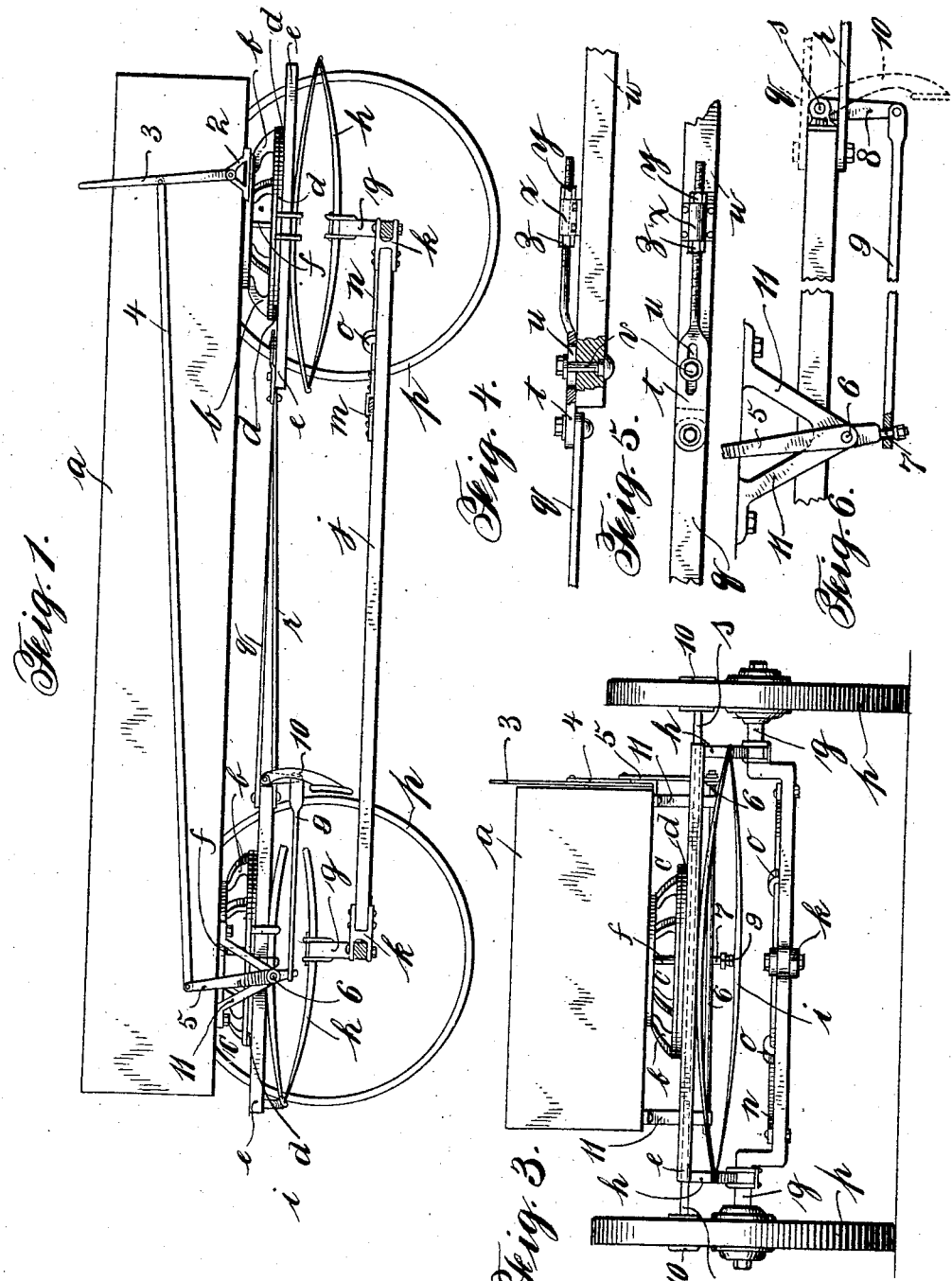

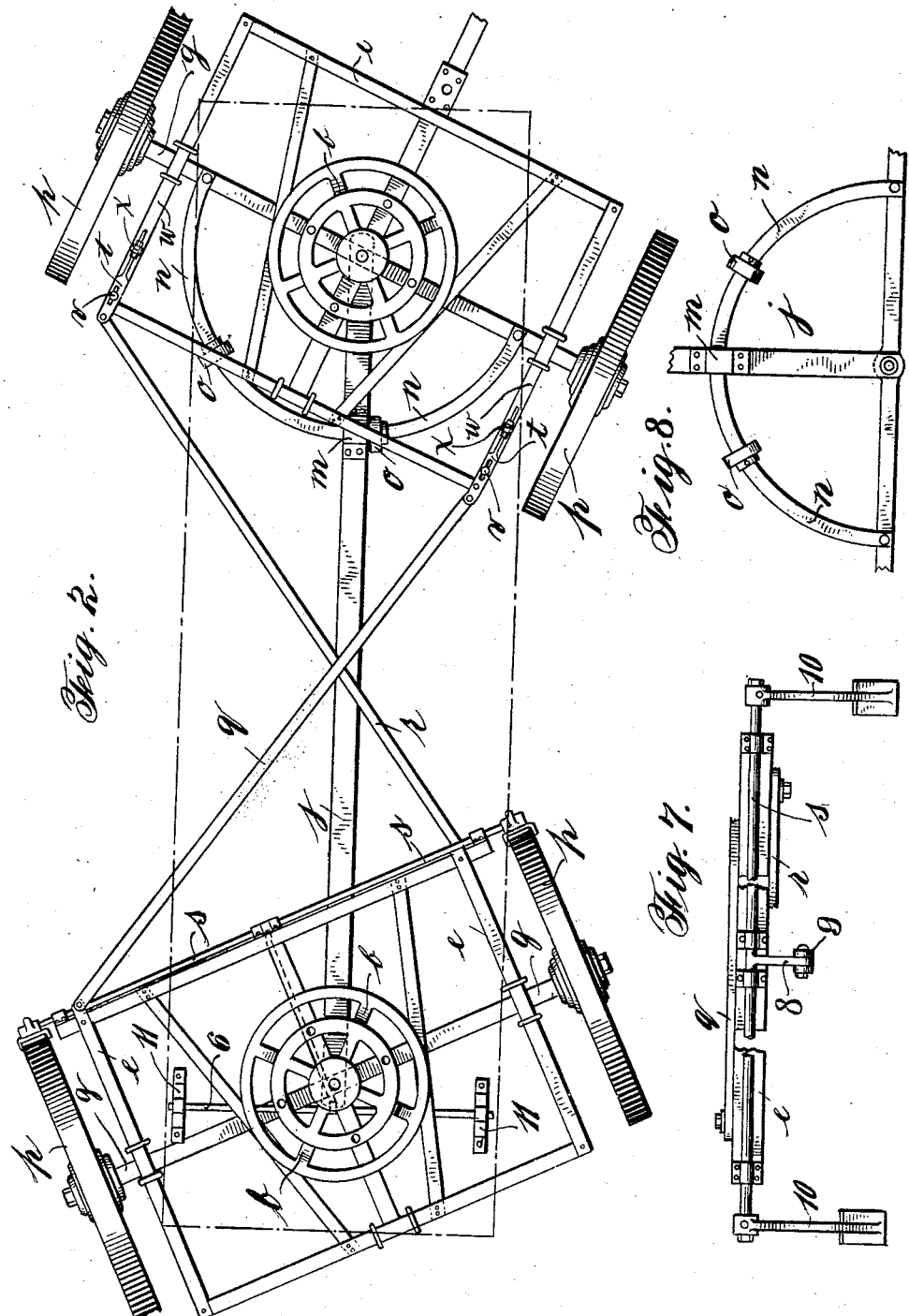

HARRY E. KLINE, OF SHAMOKIN, PENNSYLVANIA.

ROAD-VEHICLE.

No. 857,633.   Specification of Letters Patent.   Patented June 25, 1907.

Application filed November 16, 1906. Serial No. 343,740.

*To all whom it may concern:*

Be it known that I, HARRY E. KLINE, residing at Shamokin, in the county of Northumberland and State of Pennsylvania, have invented certain new and useful Improvements in Road-Vehicles, of which the following is a specification, reference being had to the accompanying drawings.

My invention relates to improvements in road vehicles, such as buggies, wagons and the like; and one object of my invention is to provide a road vehicle of simple, efficient and comparatively cheap construction.

In my new vehicle, the two frames upon which are supported the ends of the wagon body are connected by link-rods which extend diagonally from one frame to the other and are pivotally secured thereto; and one feature of my invention resides in the provision of means for varying the point of connection of the link-rod to one of the frames and thereby the throw or swing of the link-rod. By this arrangement of parts, the mechanism is so adjusted that the rear wheels will follow in the exact trace of the front wheels, and the wagon may be turned in a minimum space.

Another feature of my invention lies in the coupling-bar by which the axles are connected and which serves to resist the shock due to the application of the brakes. It also serves to take the weight off the springs during the turning movement and to limit the degree of that movement by acting as an abutment for stops carried by a semi-circular band the ends of which are secured to one of the axles. Thus, the wagon is kept free from being cramped and from being scraped by the wheels during turning.

Other features of my invention will be set forth in the description and claims hereinafter.

In the drawings illustrating the principle of my invention and the best mode now known to me of applying that principle, Figure 1 is a side elevation of my new wagon; Fig. 2 is a plan view of the running gear, the wagon body being indicated by the dotted lines; Fig. 3 is a rear end view; and Figs. 4, 5, 6, 7 and 8 are details hereinafter referred to.

To each end of the wagon body $a$ is secured he upper member $b$ of the fifth wheel $c$, the lower member $d$ of which is secured to the frame $e$, the two members $b$, $d$ being held in place by the king-bolt $f$. The rear frame $e$ is supported upon the axle-ends $g$ between which and the frame are interposed the side-springs $h$ to the rear end of which is suitably secured the rear spring $i$. Between the front frame $e$ and the axle-ends $g$ are interposed, one on each side, the side-springs $h$. The number of springs used is, however, immaterial, so far as my invention is concerned.

To the axle-body of the front and rear axle is bolted the coupling-bar $j$, the ends of which are provided with forks $k$. Near its front end the coupling-bar $j$ is provided with a cap-plate $m$ between which and the coupling-bar travels a semi-circular band $n$ the ends of which are secured to the front axle-body and which is provided with stops $o$ adapted and designed to abut against the coupling-bar $j$ at the limit of the turning movement in either direction and thereby to protect the wagon-body from being scraped by the wheels $p$.

To the front corners of the rear frame $e$ is pivotally secured one end of each of the link-rods $q$, $r$, the link-rod $q$ being secured to the top of the rear frame $e$ while the other link-rod $r$ is secured to the bottom so that there is a space left for the passage of the brake-rod $s$, as is most clearly shown in Fig. 7. The front end of each of the link-rods $q$, $r$ is connected to the adjusting device shown in detail in Figs. 4 and 5, Fig. 5 being a plan view and Fig. 4 being an elevation. The front end of the link-rod is pivotally secured to an adjusting slide $t$ formed with a slot $u$ through which passes a bolt $v$ by which the slide is held upon the side-piece $w$ of the frame. Secured to the side-piece $w$ on each side of the front frame $e$ is a box $x$ through which projects the threaded end of the slide $t$ upon which are mounted the adjusting nut $y$ and the lock-nut $z$. By means of the adjusting mechanism just described, the swing of the link-rods may be accurately adjusted, so that the rear wheels will follow in the exact trace of the front wheels.

The brake-mechanism is shown in Figs. 1, 6 and 7. To the front end of the wagon body is secured a bracket 2 in which is fulcrumed the brake-lever 3 connected by the link 4 with the crank-arm 5 mounted fast upon one end of the shaft 6 which is mounted in brackets 11 and from near the middle of which downwardly projects the pin 7. The latter is connected with the rocker-arm 8 by the link 9; and the rocker-arm 8 is mounted fast upon the brake-rod s upon each end of which is mounted a brake-shoe 10.

I claim:

1. In a wagon, the combination of a pair of axles; a frame mounted on each of said axles; a pair of link-rods which extend diagonally between said frames, one end of one of said link-rods being pivotally connected to the top of one of said frames and the corresponding end of the other of said link-rods being connected to the bottom of the same frame; a brake-rod rotatably mounted in said frame and extending between said link-rods; brake-shoes on said brake-rod; and means for rotating said brake-rod to apply said brake-shoes.

2. In a wagon, the combination of a pair of axles; a pair of frames mounted one on each of said axles; a pair of link-rods which extend diagonally between said frames and are pivotally secured thereto; a brake-rod rotatably mounted in one of said frames and extending transversely thereof between said link-rods; and a coupling-bar the ends of which are pivotally connected to said axles.

Signed at said Shamokin this 9th day of November, A. D. 1906, in the presence of two witnesses.

HARRY E. KLINE.

Witnesses:
J. MAL. GILLESPIE,
ELHANNAN A. KELLER.